United States Patent
Fu et al.

(10) Patent No.: US 10,542,465 B2
(45) Date of Patent: Jan. 21, 2020

(54) ANALYTICS DRIVEN WIRELESS DEVICE SESSION CONTEXT HANDOVER IN OPERATOR CLOUD

(71) Applicant: Telefonaktiebolaget LM Ericsson (Publ), Stockholm (SE)

(72) Inventors: Jing Fu, Solna (SE); Tor Kvernvik, Täby (SE); Jinghong Yang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/765,016

(22) PCT Filed: Oct. 2, 2015

(86) PCT No.: PCT/EP2015/072769
§ 371 (c)(1),
(2) Date: Mar. 30, 2018

(87) PCT Pub. No.: WO2017/054883
PCT Pub. Date: Apr. 6, 2017

(65) Prior Publication Data
US 2019/0053107 A1    Feb. 14, 2019

(51) Int. Cl.
*H04W 36/00* (2009.01)
*H04W 36/16* (2009.01)

(52) U.S. Cl.
CPC . *H04W 36/0033* (2013.01); *H04W 36/00837* (2018.08); *H04W 36/165* (2013.01)

(58) Field of Classification Search
CPC ....... H04W 36/0033; H04W 36/00837; H04W 36/165
See application file for complete search history.

(56) References Cited

U.S. PATENT DOCUMENTS 6,816,732 B1    11/2004    Farley et al.
9,432,901 B1 *   8/2016    Kwan ................ H04W 36/245
(Continued)

FOREIGN PATENT DOCUMENTS

WO    2010078589 A2    7/2010

OTHER PUBLICATIONS

International Search Report and Written Opinion issued in International Application No. PCT/EP2015/072769, dated Mar. 21, 2016, 12 pages.
(Continued)

*Primary Examiner* — Min Jung
(74) *Attorney, Agent, or Firm* — Rothwell, Figg, Ernst & Manbeck, P.C.

(57) ABSTRACT

A method and apparatus for analytics-driven wireless device session context handover in an operator cloud are provided. According to one aspect, some embodiments include a method for a network node to determine whether to perform a wireless device session context handover. The method includes determining, at the network node, a first cost of not handing over a wireless device session context based at least in part on a calculated estimate of time the wireless device will stay associated with a current base station and a calculated estimate of a cost per unit time of not performing the handover. The method also includes determining, at the network node, a second cost of handing over the wireless device session context based at least in part on at least one of context-related data, base station load, backhaul load and backhaul delay.

20 Claims, 7 Drawing Sheets

(56) References Cited

U.S. PATENT DOCUMENTS

| | | | |
|---|---|---|---|
| 2007/0160007 A1* | 7/2007 | Wang | H04W 36/00837 370/331 |
| 2008/0242301 A1 | 10/2008 | Osterling et al. | |
| 2011/0039562 A1* | 2/2011 | Balasubramanian | H04W 36/0033 455/436 |
| 2014/0064249 A1* | 3/2014 | Lee | H04W 36/023 370/331 |
| 2014/0357224 A1* | 12/2014 | Walley | H04M 15/8038 455/407 |
| 2015/0172964 A1* | 6/2015 | Huang | H04W 76/30 455/437 |
| 2016/0135105 A1* | 5/2016 | Hussain | H04W 36/32 370/331 |
| 2016/0337909 A1* | 11/2016 | Cai | H04W 36/0033 |

OTHER PUBLICATIONS

Farahbakhsh, R., "Smooth Handover by Synchronizing Context Transfer Protocol and Fast Mobile IPv6", Internet Multimedia Services Architecture and Applications (IMSAA), IEEE International Conference, Piscataway, NJ, USA, Dec. 2009, 5 pages.
Loughney, Ed., J., "Context Transfer Protocol (CXTP)", Network Working Group, Jul. 2005, 33 pages.

* cited by examiner

ANALYTICS DRIVEN WIRELESS DEVICE SESSION CONTEXT HANDOVER IN OPERATOR CLOUD

CROSS REFERENCE TO RELATED APPLICATION(S)

This application is a 35 U.S.C. § 371 National Stage of International Patent Application No. PCT/EP2015/072769, filed Oct. 2, 2015, designating the United States, the disclosure of which is incorporated by reference.

TECHNICAL FIELD

Wireless communications, in particular, a method and apparatus for analytics-driven wireless device session context handover in an operator cloud.

BACKGROUND

In conventional wireless networks, multiple network nodes, such as base stations, exist in an operator cloud, where each network node acts as a cloud server. An example of such a configuration is shown in FIG. 1. The operator cloud 10 includes cloud servers 12a, 12b and 12c, referred to herein collectively as cloud servers 12. Cloud server 12a is at a base station 14a, and cloud server 12c is at a base station 14b. Base stations 14a and 14b are referred to herein collectively as base stations 14. may run a wireless device session context for one or more wireless devices 18a (WD1), 18b (WD2), 18c (WD3) and 18d (WD4), referred to herein collectively as wireless devices 18. A wireless device session context is information related to a current communication session of the wireless device, and may include pre-fetched video, web pages, emails, application session information and wireless device configuration, as well as knowledge learned via machine learning. Network elements that use the wireless device session context may be the wireless device 18 and/or the base station 14 that serves the wireless device.

When a wireless device performs a radio handover from one base station to another, as for example, from base station 14a to 14b, the wireless device session context may remain in the cloud server of origin, such as cloud server 12a, or be handed over to the destination cloud server, such as cloud server 12b. Thus, a radio handover, in which control of communications with the wireless device is passed from one base station to another, may occur with or without a wireless device session context handover. Note also that the wireless device context session may be handed over from the cloud server 12a to the cloud server 12c. Thus, upon performing the radio handover, the wireless device session context may remain at the origin base station, be transferred to the same base station to which the radio handover occurred, be handed over to a different base station, or be transferred to a network node higher in the hierarchy such as the MME 16 or even a cloud server in the application layer.

The selected target cloud server to which the session context is handed over, or whether to handover the session context at all, may depend on a tradeoff between minimization of delay and system performance. Delay in this case refers to the delay of the content being sent between the mobile device and the terminating end of the communication session and not the delay relating to the communication session setup. One approach is to always handover the wireless device session context to the base station to which the wireless device is handed over. However, if the radio handovers occur too frequently, the corresponding high frequency of occurrence of session context handovers will degrade system performance because of the utilization of bandwidth and processor load in the wireless device and the network needed to perform the session context handovers. Another approach is to limit the frequency of wireless device session context handovers. But this may result in wireless devices being further away from the current cloud server, resulting in degraded performance due to longer network delay.

SUMMARY

Some embodiments advantageously provide a method and system for analytics-driven wireless device session context handover in a wireless communication network operator cloud. According to one aspect, some embodiments include a method for a network node to determine whether to perform a wireless device session context handover. The method includes determining, at the network node, a first cost of not handing over a wireless device session context based at least in part on a calculated estimate of time the wireless device will stay associated with a current base station and a calculated estimate of a cost per unit time of not performing the handover. The method also includes determining, at the network node, a second cost of handing over the wireless device session context based at least in part on at least one of context-related data, base station load, backhaul load and backhaul delay. The method also includes comparing the first and second cost and deciding to handover the wireless device session context based on the comparison between the first cost of not handing over the wireless device session context and the second cost of handing over the wireless device session context. The method also includes sending a handover trigger when a decision to handover is made.

According to this aspect, in some embodiments, the method includes determining the first cost of not handing over the wireless device session context by: estimating the amount of time the wireless device will stay associated with a current base station; estimating the cost per unit time of not performing the wireless device session context handover; and determining a product of the estimated amount of time the wireless device will stay associated with the current base station and the cost per unit time of not performing the wireless device session context handover. In some embodiments, estimating an amount of time the wireless device will stay associated with the current base station includes observing at least one of a number of previous wireless device radio handovers per unit time and a duration the wireless device has been associated with the current base station. In some embodiments, estimating an amount of time the wireless device will stay associated with the current base station includes observing a wireless device profile, the wireless device profile having information including an average duration the wireless device remains in each of a plurality of cells. In some embodiments, determining the second cost of handing over the wireless device session context includes determining a wireless device session context size indicating an amount of data to transfer in performing the wireless device session context handover. In some embodiments, determining the second cost of handing over the wireless device session context includes collection of session states from an application of the session.

In some embodiments, determining the second cost of handing over the wireless device session context includes a cost of re-establishment of the session in a new base station.

In some embodiments, determining the second cost of handing over the wireless device session context includes at least one of a source base station load and a target base station load. In some embodiments, determining the second cost of handing over the wireless device session context includes at least one of a backhaul load and a backhaul delay. In some embodiments, determining the second cost of handing over the wireless device session context includes a cost of handing over the wireless device session context to a mobile management entity, MME. In some embodiments, the method further includes, when the first cost does not exceed the second cost, determining a next time of evaluation to determine when to perform the wireless device session context handover. In some embodiments, determining the first cost of not handing over the wireless device session context includes determining a probability that the wireless device will stay associated with a current base station within a specified amount of time. In some embodiments, the first cost of not handing over the wireless device session context is based on a time for performing the wireless device session context handover.

According to another aspect, some embodiments include an apparatus for determining whether to perform a user equipment, wireless device, session context handover. The apparatus include processing circuitry including a memory and processor. The memory is configured to store: a first cost of not handing over a wireless device session context; and a second cost of handing over the wireless device session context. The processor is configured to: determine the first cost of not handing over the wireless device session context based on a calculated estimate of time the wireless device will stay associated with a current base station and a calculated estimate of a cost per unit time of not performing the handover; determine the second cost of handing over the wireless device session context based at least in part on at least one of context-related data, base station load, backhaul load and backhaul delay; compare the first and second cost; decide to handover the wireless device session context based on the comparison of the first cost of not handing over the wireless device session context and the second cost of handing over the wireless device session context and sending a handover trigger when a decision to handover is made.

According to this aspect, in some embodiments, determining the first cost of not handing over the wireless device session context includes: estimating the amount of time the wireless device will stay associated with a current base station; estimating the cost per unit time of not performing the wireless device session context handover; and determining a product of the estimated amount of time the wireless device will stay associated with the current base station and the cost per unit time of not performing the wireless device session context handover. In some embodiments, the estimating an amount of time the wireless device will stay associated with the current base station includes observing at least one of a number of previous wireless device radio handovers per unit time and a duration the wireless device has been associated with the current base station. In some embodiments, the estimating an amount of time the wireless device will stay associated with the current base station includes observing a wireless device profile, the wireless device profile having information including an average duration the wireless device remains in each of a plurality of cells. In some embodiments, determining the second cost of handing over the wireless device session context includes determining a wireless device session context size indicating an amount of data to transfer in performing the wireless device session context handover. In some embodiments, determining the second cost of handing over the wireless device session context includes collection of session states from an application of the session. In some embodiments, determining the second cost of handing over the wireless device session context includes a cost of re-establishment of the session in a new base station. In some embodiments, determining the second cost of handing over the wireless device session context includes at least one of a source base station load and a target base station load. In some embodiments, determining the second cost of handing over the wireless device session context includes at least one of a backhaul load and a backhaul delay. In some embodiments, determining the second cost of handing over the wireless device session context includes a cost of handing over the wireless device session context to a mobile management entity, MME. In some embodiments, the apparatus further includes, when the first cost does not exceed the second cost, determining a next time of evaluation to determine when to perform the wireless device session context handover.

According to yet another aspect, some embodiments include an apparatus for determining whether to perform a user equipment, wireless device, session context handover. The apparatus includes a non-handover cost determination module configured to determine a first cost of not handing over a wireless device session context based on a calculated estimate of time the wireless device will stay associated with a current base station and a calculated estimate of a cost per unit time of not performing the handover. The apparatus further includes a handover cost determination module configured to determine a second cost of handing over the wireless device session context based at least in part on at least one of context-related data, base station load, backhaul load and backhaul delay. The apparatus further includes a comparison module configured to compare the first and second cost. The apparatus further includes a decision module configured to decide to handover the wireless device session context based on the comparison of the first cost of not handing over the wireless device session context and the second cost of handing over the wireless device session context. The apparatus further includes a handover module configured to send a handover trigger when a handover decision is made.

According to this aspect, in some embodiments, the non-handover cost determination module is configured to: estimate the amount of time the wireless device will stay associated with a current base station; estimate the cost per unit time of not performing the wireless device session context handover; and determine a product of the estimated amount of time the wireless device will stay associated with the current base station and the cost per unit time of not performing the wireless device session context handover.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
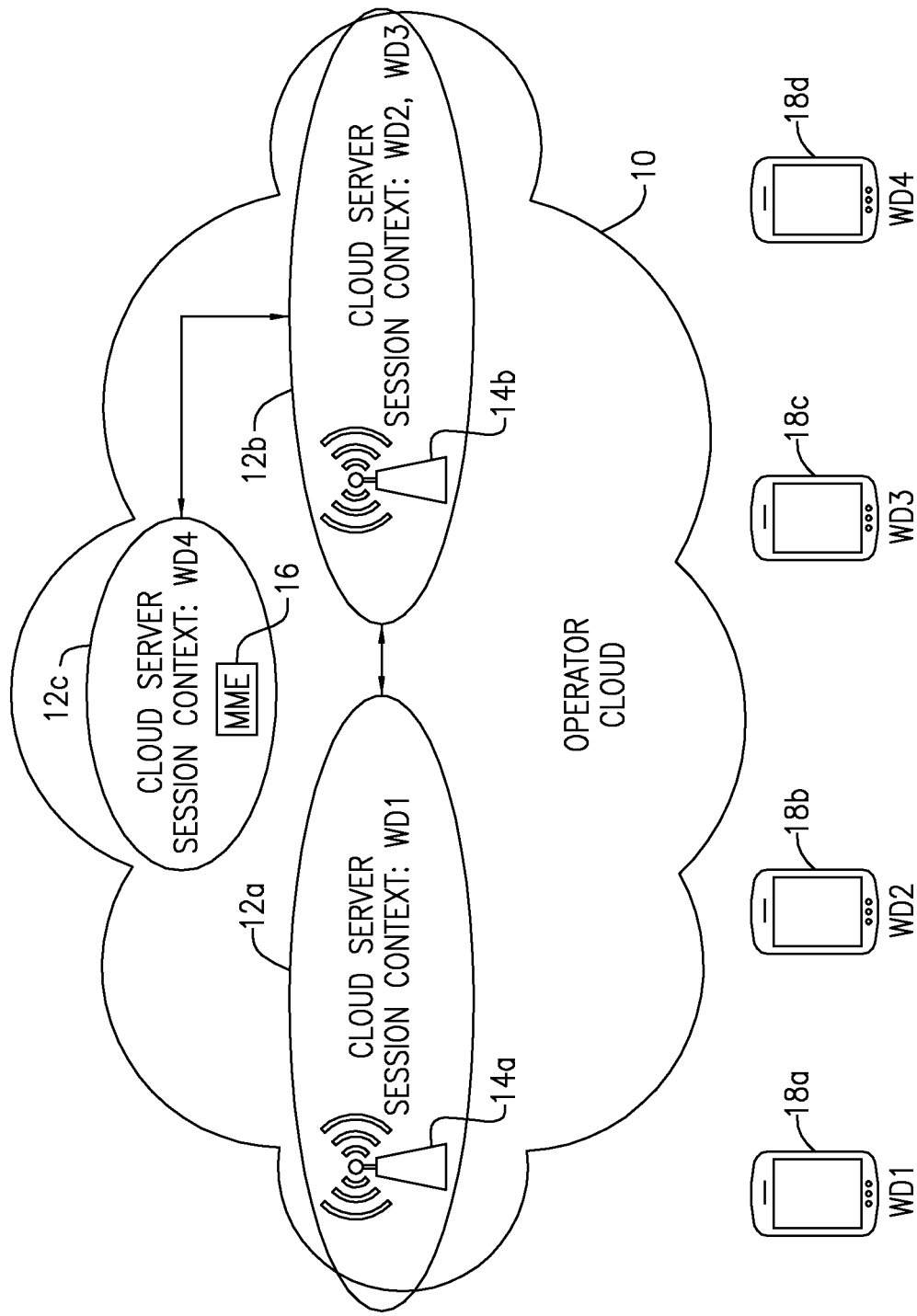
FIG. 1 is a block diagram of an operator cloud having multiple cloud servers in a wireless network.

Before describing in detail exemplary embodiments, it is noted that the embodiments reside primarily in combinations of apparatus components and processing steps related to analytics-driven wireless device session context handover in an operator cloud. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein provide an analytics-driven approach to determining whether and when to perform a wireless device session context handover. In general, if a wireless device 18 performs radio handovers frequently, such as when the wireless device user is on a bus, performing a session context handover as frequently as the radio handovers occur would excessively consume resources and bandwidth on the link between the network nodes involved in the session context handovers, so that a session context should not occur every time a radio handover occurs. Conversely, if the network knows that the wireless device 18 is moving from a location to a location where the wireless device 18 customarily spends a long amount of time, such as the wireless device user's home or office, a session context handover should be made to a closer base station.

Embodiments determine whether and when to perform a wireless device session context handover based at least in part on a cost of not performing a session context handover and a cost of performing the session context handover. The term cost as used herein is a metric for consumed resources and connection characteristics such as bandwidth, load and latency. The cost of not handing over the wireless device session context may be based on a calculated estimate of the time the wireless device will stay associated with a current base station and a calculated estimate of a cost per unit time of not performing the handover. The cost of handing over the wireless device session context may be based on context related data, base station load, backhaul load and backhaul delay. Also, a hierarchical handover of the wireless device session context may be implemented if the wireless device is likely to perform multiple radio handovers between base stations served by the same higher level network node, such as the MME, in case there is more computing resources and/or higher bandwidth than provided by a base station.

One advantage to some embodiments described herein is that unnecessary and costly wireless session context handovers can be avoided after radio handovers to save network and computational resources, while still providing reasonably good quality of service for the wireless device and base stations with relatively fast wireless device session context access.

Figure 2:
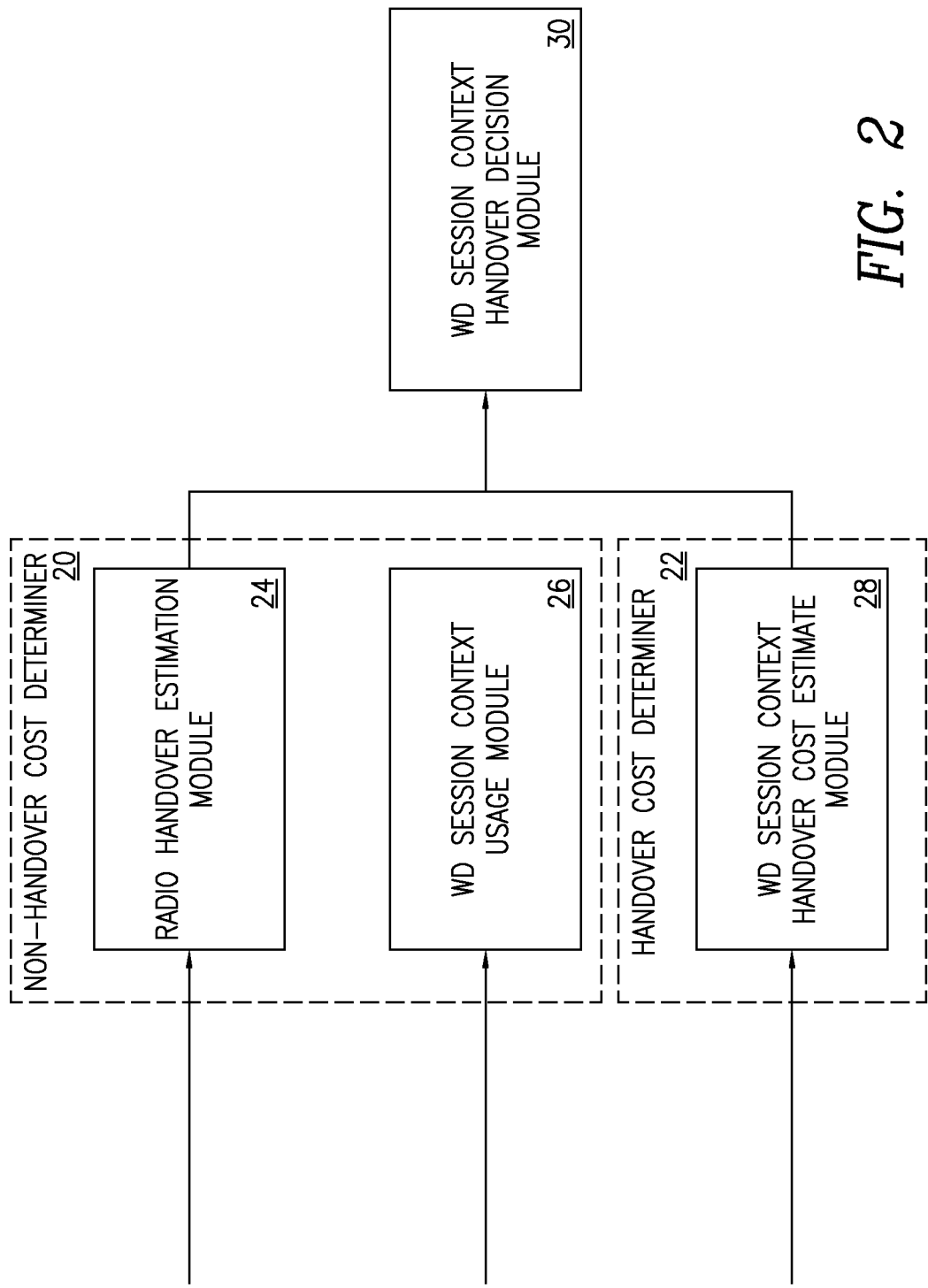
FIG. 2 is a block diagram of a system configured to determine whether to perform a wireless device session context handover.

Referring now to the drawing figures in which like elements have like reference designators, there is shown in FIG. 2 a block diagram illustrating principles of some embodiments described herein. A non-handover cost determiner 20, determines a cost of not handing over the wireless device session context and a handover cost determiner 22, determines a cost of handing over the wireless device session context.

A radio handover estimation module 24 may calculate an estimate of how long the wireless device will remain associated with the current base station. In other words, the radio handover estimation module 24 may calculate an estimate of the time until the next radio handover of the wireless device. This calculation may be based on a record or knowledge of previous radio handovers of the wireless device 18 as well as recent quality of the wireless connection between the wireless device 18 and the current base station. Alternatively, or in addition, the radio handover estimation module 24 may predict the probability that the wireless device will perform a radio handover to another base station in a specified time frame. An example is shown in Table 1.

TABLE 1

| | Time Window | | | |
|---|---|---|---|---|
| | 1 min | 5 min | 1 hour | 5 hour |
| Handover Probability | 30% | 40% | 45% | 50% |

Table 1 shows that there is a 30% probability of a radio handover in 1 minute, a 40% probability of radio handover is 5 minutes, etc. The values of Table 1 are examples only, and the embodiments are not limited to these values. Method for determine handover probabilities are known in the art and outside the scope of this disclosure. An alternative output of the radio handover estimation module 24 may be a predicted average time the wireless device will stay with the current base station, or, in other words, the predicted future time of radio handover. Machine learning techniques may be employed to make these predictions using inputs such as time durations between previous radio handovers, the wireless device radio quality measurements and trends over time. As an example, trends of the radio quality may be used to predict when the next handover will happen. It is assumed that the radio quality is reduced close to the cell borders. This means that, when wireless device 18 moves closer to the cell border, the trend of the radio quality will be decreasing and the probability of a handover will increase Note that the radio handover estimation module 24 may also have information concerning which cells belong to each network node, e.g., base station. In addition, profile information about the wireless device 18 can be used as input for radio handover predictions. This profile information may include which cells serve the wireless device for a long time, such as cells covering the wireless device user's home or office, and which cells serve the wireless device for only a short period of time, such as cells covering a shopping mall or cells on the route between home and office. This information can be stored with the wireless device session context.

Further, information for predicting time to next radio handover may include current movement speed of the wireless as determined from a wireless device positioning system, and/or information about cell borders and neighboring cell lists, which information may be from an operator network. With this information it may be possible to improve an accuracy of a handover prediction. Note also in some circumstances, only a portion of the wireless device session context may be handed over, while another portion of the wireless device session context is not handed over.

A wireless device session context usage module 26 may calculate an estimate of the cost per unit time of not handing over the wireless device session context. The cost per unit time of not handing over the wireless device session context may be based on previous and current context resource usage such as memory and computing resources dedicated to support the current wireless device session context, and/or may be based on the cost of the additional delay that is added if the cloud session remains on a base station further away from wireless device 18 if the cloud session is not handed over. To calculate an estimate of the cost per unit time of not performing wireless device session context handover, the wireless device session context usage module 26 may monitor the usage of information stored in the wireless device session context. If the wireless device or base station is accessing the wireless device session context frequently, the cost per unit time may be quite high. This cost per unit time is a measure of the service or system performance degradation per unit time where the cost can be dependent upon use case. An example of use cases is illustrated in Table 2.

TABLE 2

| Application | Time since last access | Cost |
|---|---|---|
| Car2Car (delay sensitive) | 10 seconds | Very High |
| Device2Device (e.g. video camera to cloud storage) | >10 minutes | Low |

Table 2 shows that when the communication is Car2Car, e.g., between moving cars, the cost of not handing over the wireless device session context may be very high, whereas when the communication is between two relatively stationary devices that may be transporting video via the cloud, the cost of not handing over the wireless device session context may be very low. That said, in cases using videos cameras, one reason for not performing handovers at too regular an interval is that video applications are not very delay sensitive and the amount of session data to transfer may be very large and not lend itself to a cloud session handover.

The very high and low designations in this example substitute for actual numerical values representing costs in some embodiments. In other words, it is understood that actual numerical values and thresholds can be used to establish "high" and "low" designations and variations thereof. In general, for real time services, the cost for not performing wireless device session context handover is significantly higher than for low priority background services. Note also, that the cost per unit time may depend on the predicted time for radio handover. For example, the cost per unit time may be low if the predicted time is less than a minute and be high if the predicted time is more than one minute. This could be the case where, for example, the user has a video buffer of one minute so that it is acceptable to handover the wireless device session context in one minute.

Figure 3:
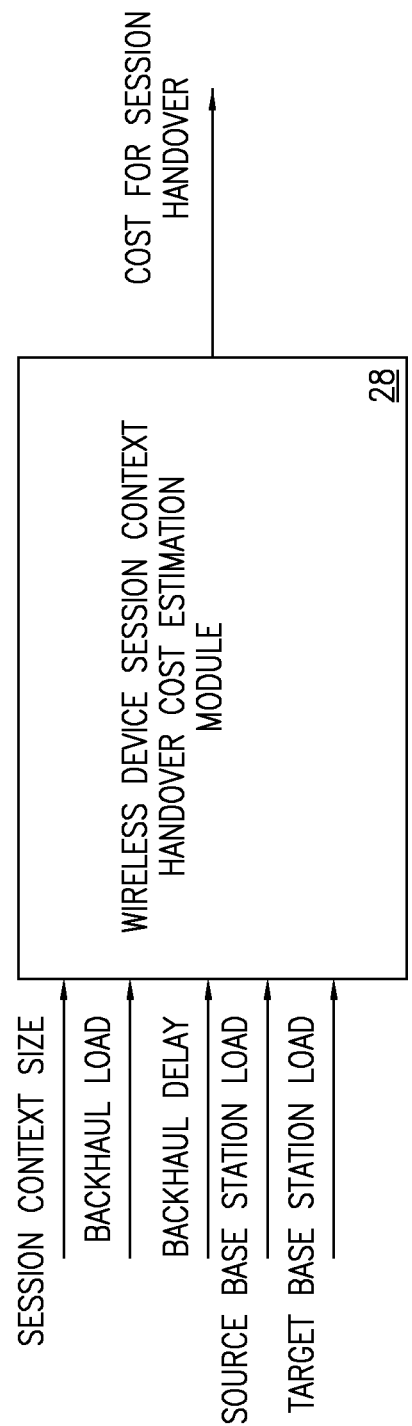
FIG. 3 is a functional diagram of a wireless device session context handover cost estimation module.
Figure 4:
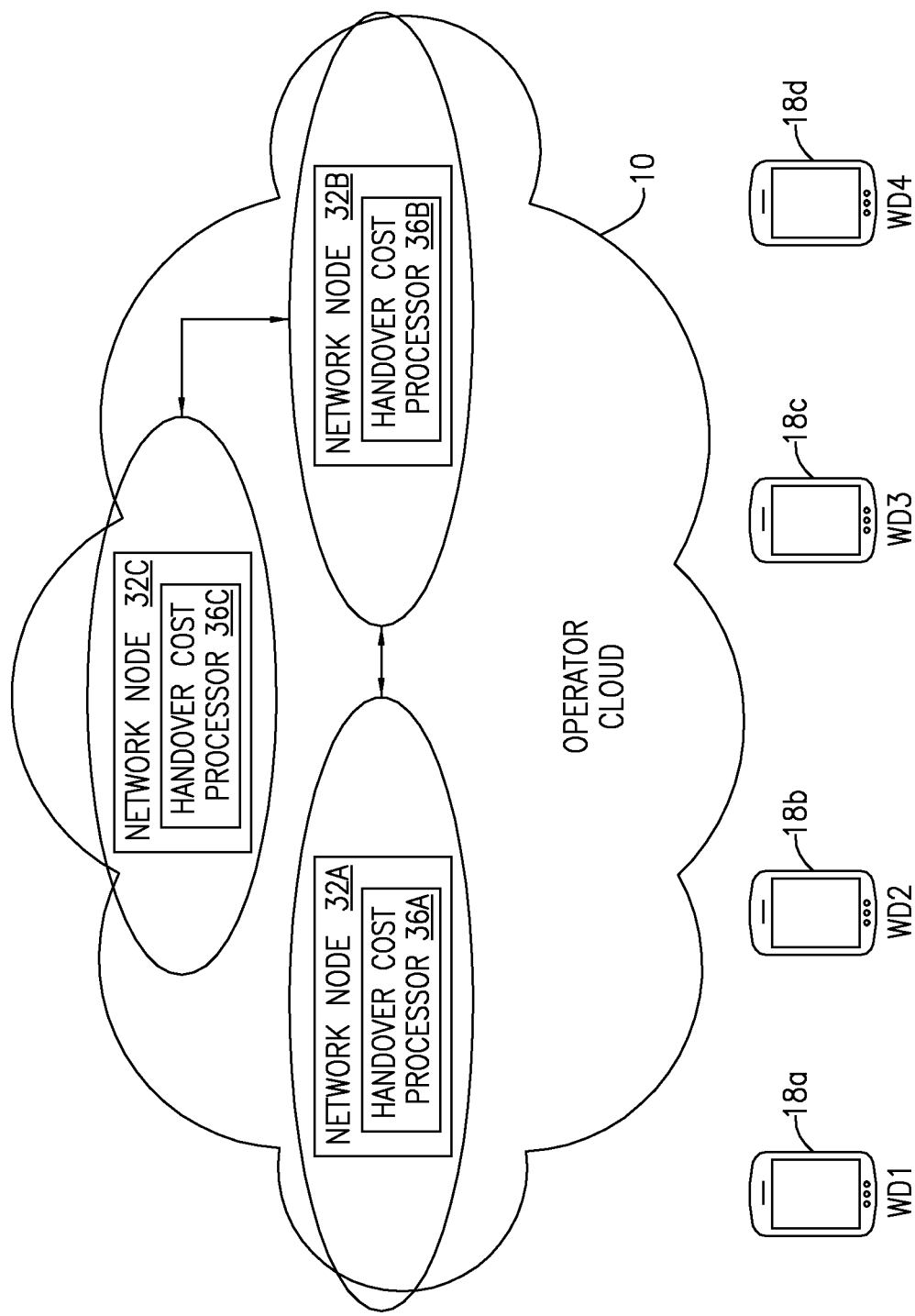
FIG. 4 is a block diagram of an operator cloud having network nodes configured for handover cost processing.

A wireless device session context handover cost estimation module 28 calculates an estimate of the cost of performing a wireless device session context in terms of time, network load and processor load. This is shown by the block diagram of FIG. 3. FIG. 3 shows that the wireless device session context handover cost estimation module may receive as inputs wireless device session context size, backhaul load, backhaul delay, source base station load and target base station load. The wireless device session context size indicates the amount of data that would be transferred from one base station to another if the wireless device session context handover were performed. This data may include session state information and possibly also session content data. The session state information may be transmitted using known protocols such as the Internet Engineering Task Force-Content Transfer Protocol (IETF-CXTP). The cost computed by the wireless device session context handover cost estimation module 28 may also include the cost of collecting session states from applications and reestablishment of the sessions in a new base station. The cost may also depend on the current source and target base station load. Additional input to the wireless device session context cost estimation module may include the current backhaul capacity between the two base stations and the time required for performing the wireless device session context handover. A formula based method can be used for this estimation when the handover cost is a function of wireless device session context size, base station and cloud processor load, and current backhaul capacity. An example formula is as follows:

wireless device session context handover
cost=$P1$*wireless device session context size+
$P2$*backhaul load+$P3$*backhaul delay+
$P4$*source base station load+$P5$*target base
station load, where $P1$ to $P5$ are parameters which may be positive to indicate the higher the load, the higher the network delay, and the larger the wireless device session context size, then the higher handover cost. Other formulas having these parameters, fewer than these parameters or even other parameters may be calculated. Since the handover may be from base station to higher node, different alternative costs estimates may need to be calculated FIG. 4. is a block diagram of an example operator cloud having network nodes 32 capable of handover cost processing. Thus, one cloud server may have network node 32A, another cloud server may have a network node 32B, and another higher level cloud server may have network node 32C (network nodes 32A, 32B and 32C are referred to collectively as network node 32), where each network node 32 has a corresponding handover cost processor 36A, 36B and 36C, performing the functions of the non-handover cost determiner 20 and handover cost determiner 22, described above.

The consequences of wireless device session context handover may vary with the applications running on the network node 32 and/or wireless device 18. Some applications have very strict requirements on latency. For example, car to car crash alarm reporting system may have a lower threshold for wireless device session context handover than other applications. The radio handover estimation module 24 may account for this by retrieving properties from the application for each wireless device. For wireless devices with multiple applications running, there may be cases where only the sessions for the most critical applications are handed over. Some examples where a local cloud, e.g., a base station near the wireless device, may be desired include:
- Car2Car applications put very high requirements on connectivity. The availability and delay of the connection between the base station and the wireless device should be reduced. Examples include car crash alarm reporting and velocity control to maintain a fixed distance between cars.
- Industrial campus processes having multiple pieces of production equipment to communicate with each other or to a central control unit and/or facility storage.
- Indoor long term evolution (LTE): e.g., devices in a building that need to share a high volume of data such as surveillance cameras, televisions, monitors, washing machines and electrical meters.
- Device2Device: e.g., video cameras, projectors, consoles, mobile phones, heart monitors, training monitors.

The outputs of modules 24, 26 and 28 are combined and input to a wireless device session context decision module 30, which makes a decision whether to perform a wireless device session context handover. A goal of the wireless device session context handover decision module is to make a decision whether to handover a wireless device session context or not and whether the handover is to be horizontal (between two network nodes 32 at the same level, such as between two base stations) or hierarchical (between two network nodes 32 at different hierarchical levels, such as between a base station and an MME). If the decision is not to handover, a time for a next evaluation of the decision can be specified.

The wireless device session context handover decision module 30 weighs the cost of not performing the wireless device session context handover against the cost of performing the wireless device session context handover. Table 3 shows two different examples of the operation of an embodiment of the wireless device session context handover decision module 30.

TABLE 3

| Prediction cases | Predicted time for next radio handover | WD session context usage estimation | Handover cost estimation | Perform WD session context handover? | Potential next evaluation time |
|---|---|---|---|---|---|
| Case 1 | 120 s | 5/s | 200 | 120 * 5 > 200 Handover | — |
| Case 2 | 5 s | 15/s | 105 | 5 * 15 < 105 No handover | 7 s |

In Table 3, two cases are presented. In case 1, the predicted time for a next radio handover, as obtained from the radio handover estimation module 24, is 120 seconds. The cost per unit time of not handing over the wireless device session context, as obtained from the wireless device session context usage module 26, is 5 per second. The cost of wireless device session context handover, as obtained from the wireless device session context handover cost estimation module, is 200. The product of the predicted time for handover obtained from radio handover estimation module 24 and the context usage estimation obtained from wireless device session context usage module 26 is compared to the handover cost estimation from wireless device session context handover cost estimation module 28. In this case, the cost of not handing over the wireless device session context exceeds the cost of wireless device session context handover, so that the decision is to handover the wireless device session context. An opposite result is obtained in Case 2, where a potential next evaluation time of 7 seconds is specified. Other evaluation times may be specified instead. In Case 2, the next evaluation time (7 seconds) is obtained by dividing by the cost of wireless device session context handover (105) by the wireless device session context handover cost per unit time (15/second). In cases where there are multiple radio handovers between base stations serviced by the same MME or other higher network node, a hierarchical handover to the MME or to the other higher network node may be more efficient than handovers between the base stations, assuming the higher network node has sufficient computer power and bandwidth available.

An example of a case when a hierarchical handover may occur is when the cost of not performing a handover to the base station closest to the wireless device 18 after a wireless device communication session handover is low. This could be a situation where wireless device 18 is not currently using a service or will not use the service predicted by wireless device session context usage module 26, and the loads on the originating and terminating base stations are high. If the predicted number of handovers in the near future is high, the threshold for performing a hierarchical handover is even lower. The cost of performing the handover, e.g., control signaling plus session media transfer, must also be lower than the cost of the additional load on originating the base station is if not performing a hierarchical hand over.

Figure 5:
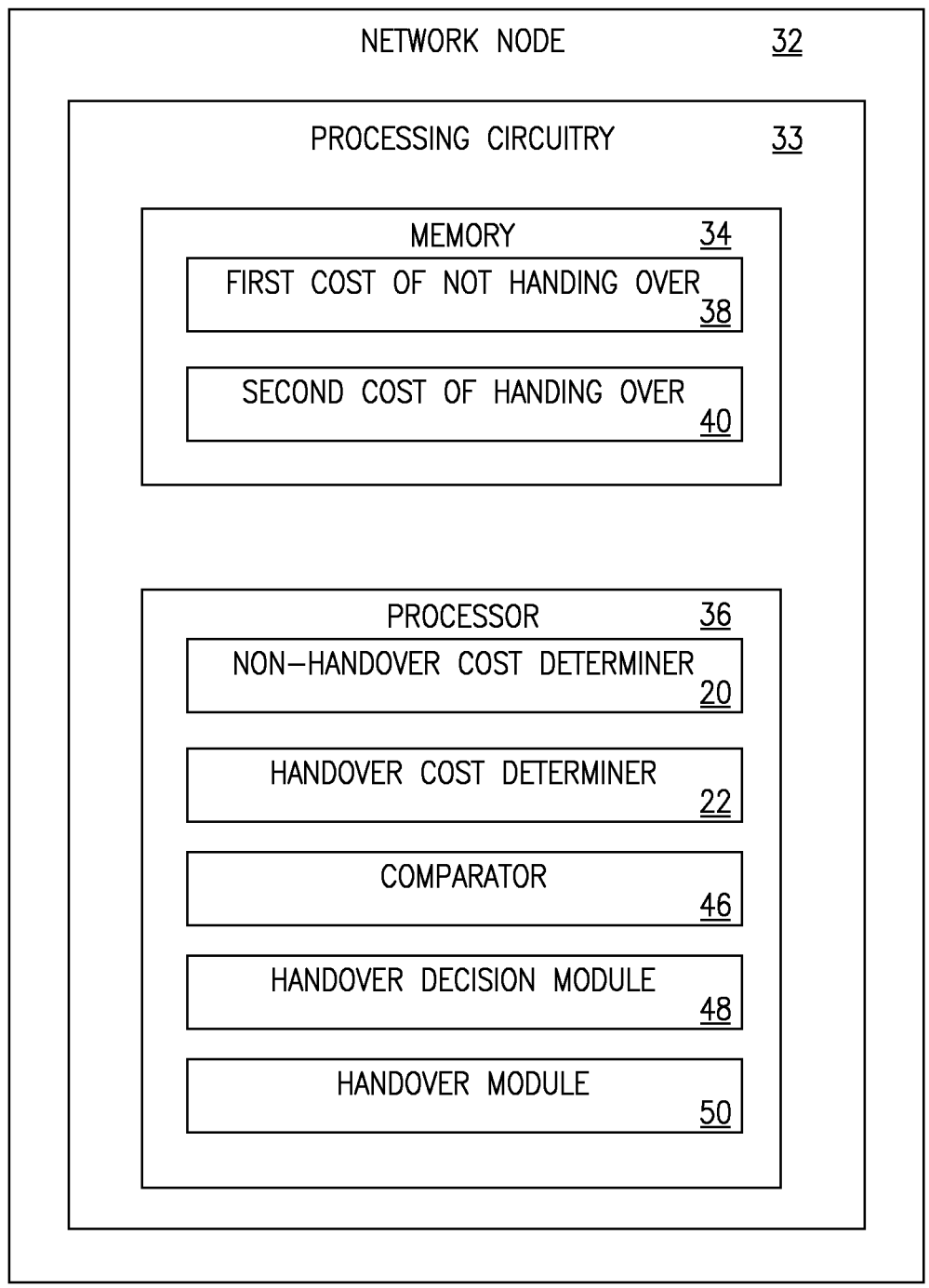
FIG. 5 is a block diagram of a network node for determining whether to perform a wireless device session context handover.

FIG. 5 is a block diagram of a network node 32 configured to perform analytics-driven wireless device session context handover as described above. The network node 32 could be a base station, such as an eNB of a long term evolution (LTE) network, or a higher level network node, such as an MME in an LTE network. The network node has processing circuitry 33 which may include a memory 34 and a processor 36 operating under the direction of software stored by the memory 34. In alternative embodiments, the processing circuitry may include application specific integrated circuitry, and/or a programmed floating point gate array configured to perform the cost processing functions described herein.

In FIG. 5, the memory 34 is configured to store a cost of not handing over the wireless device session context 38 and a cost of handing over the wireless device session context 40. The processor 36 is configured to implement a non-handover cost determiner 20, which performs the functions described above with reference to FIG. 2. The processor 36 is also configured to implement a handover cost determiner 22, which performs the functions described above with reference to FIG. 2. The processor 36 is also configured to implement a comparator 46 that weighs the costs of handover to the costs of non-handover as described above with reference to Table 2, in some embodiments. The processor 36 also implements the handover decision module 48 corresponding to the wireless device session context handover decision module 48. In other words, the handover decision module 48 makes a decision based on the comparison performed by the comparator 46 whether to perform the wireless device session context handover. In some embodiments, the processor 36 is further configured to implement a handover module 50 which effectuates the wireless device session context handover.

Figure 6:
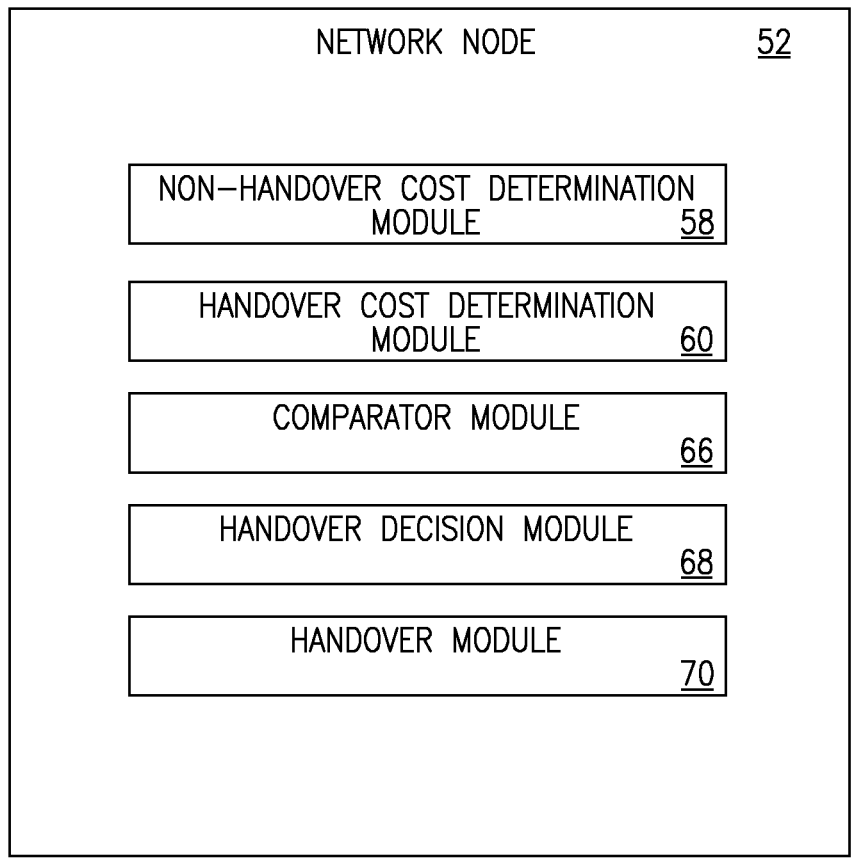
FIG. 6 is a block diagram of an alternative network node for determining whether to perform a wireless device session context handover.

FIG. 6 is a block diagram of an alternative embodiment of a network node 52 implemented as a collection of software modules that can be executed by a computer processor. The network node 52 includes a non-handover determination module 58 which performs the functions of the combination of radio handover estimation modules 24 and wireless device session context usage module 26 to determine a cost of not performing the wireless device session context handover. The network node 52 also includes a handover cost determination module 60 which performs the functions of the wireless device session context handover cost estimation module 28 to determine a cost of performing the wireless device session context handover. The comparator module 66 compares the cost of non-handover to the cost of handover. The handover decision module 68 makes the wireless device session context handover decision based on the comparison. A handover module 70 may perform steps of handing over the wireless device session context to another network node.

Figure 7:
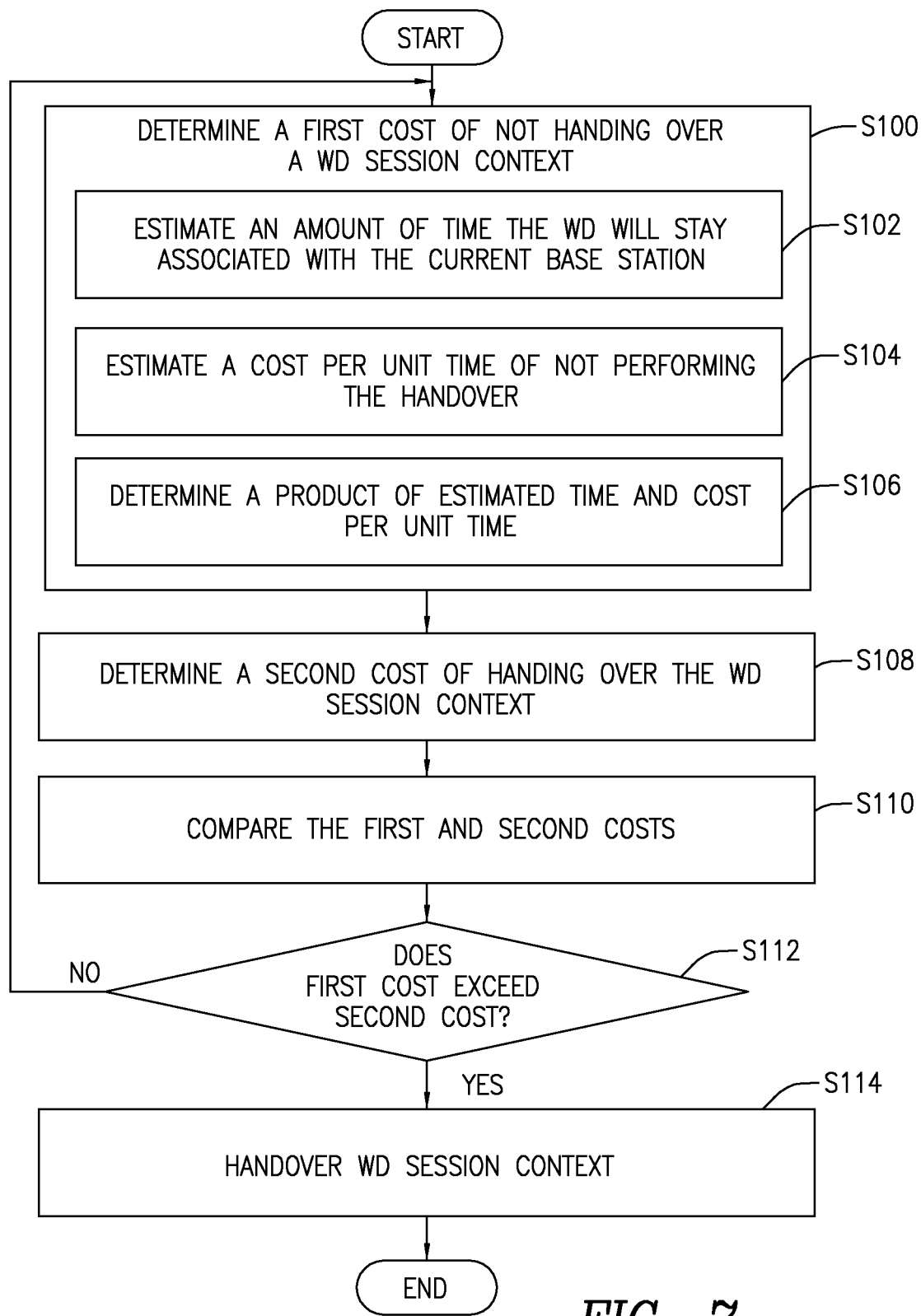
FIG. 7 is flowchart of an exemplary process for determining whether to perform a wireless device session context handover.

FIG. 7 is a flowchart of an exemplary process for determining whether to perform a wireless device session context handover based on analytics. A first cost of not handing over the wireless device session context is determined in block S100 by non-handover cost determiner 20. This may be the result of several steps. For example, an amount of time the wireless device can be expected to stay associated with a current base station is calculated by the radio handover estimation module 24 (block S102). A cost per unit of time of not performing the handover may be calculated by the WD session context usage module 26 (block S104). The product of the amount of time the wireless device is expected to say with the current base station and the cost per unit time of not performing the handover is formed to be the cost of not performing the handover (block S106). A second cost of handing over the wireless device session context is also determined by handover cost determiner 22. (block S108). The first and second costs are compared by the WD session context handover decision module 30 (block S110). If the first cost of not handing over exceeds the second cost of handing over (block S112) then wireless device session context handover is performed (block S114).

Embodiments provide an analytics-driven approach to wireless device session context handover decisions based on predicting radio handovers, cost per unit time of not handing over and cost of handover. An advantage to some embodiments described herein is that unnecessary and costly wireless session context handovers can be avoided after radio handovers to save network and computational resources, while still providing reasonably good quality of service for the wireless device and base stations with relatively fast wireless device session context access. The session context handover may be performed contemporaneously with a radio handover, or at a separate time based on cost determined before (in the predictive sense) or after a radio handover.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for a network node to determine whether to perform a wireless device session context handover, the method comprising:
 determining, at the network node, a first cost of not handing over a wireless device session context based at least in part on a calculated estimate of a time the wireless device will stay associated with a current base station and a calculated estimate of a cost per unit time of not performing the handover;
 determining, at the network node, a second cost of handing over the wireless device session context based at least in part on at least one of context-related data, base station load, backhaul load and backhaul delay;
 comparing the first cost and the second cost;
 deciding to handover the wireless device session context based on the comparison between the first cost of not handing over the wireless device session context and the second cost of handing over the wireless device session context; and
 sending a handover trigger when a decision to handover is made.

2. The method of claim 1, wherein determining the first cost of not handing over the wireless device session context includes:
 estimating the amount of time the wireless device will stay associated with a current base station;
 estimating the cost per unit time of not performing the wireless device session context handover; and
 determining a product of the estimated amount of time the wireless device will stay associated with the current base station and the cost per unit time of not performing the wireless device session context handover.

3. The method of claim 2, wherein estimating an amount of time the wireless device will stay associated with the current base station includes observing at least one of a number of previous wireless device radio handovers per unit time and a duration the wireless device has been associated with the current base station.

4. The method of claim 2, wherein estimating an amount of time the wireless device will stay associated with the current base station includes observing a wireless device profile, the wireless device profile having information including an average duration the wireless device remains in each of a plurality of cells.

5. The method of claim 1, wherein determining the second cost of handing over the wireless device session context includes determining a wireless device session context size indicating an amount of data to transfer in performing the wireless device session context handover.

6. The method of claim 1, wherein determining the second cost of handing over the wireless device session context includes collection of session states from an application of the session.

7. The method of claim 1, wherein determining the second cost of handing over the wireless device session context includes a cost of re-establishment of the session in a new base station.

8. The method of claim 1, wherein determining the second cost of handing over the wireless device session context includes at least one of a source base station load and a target base station load.

9. The method of claim 1, wherein determining the second cost of handing over the wireless device session context includes at least one of a backhaul load and a backhaul delay.

10. The method of claim 1, wherein determining the second cost of handing over the wireless device session context includes a cost of handing over the wireless device session context to a mobile management entity.

11. The method of claim 1, further comprising, when the first cost does not exceed the second cost, determining a next time of evaluation to determine when to perform the wireless device session context handover.

12. The method of claim 1, wherein determining the first cost of not handing over the wireless device session context includes determining a probability that the wireless device will stay associated with a current base station within a specified amount of time.

13. The method of claim 1, wherein the first cost of not handing over the wireless device session context is based on a time for performing the wireless device session context handover.

14. An apparatus, the apparatus comprising:
processing circuitry including a memory and processor;
the processor configured to:
obtain first information indicating an estimate of an amount of time that a wireless device will stay associated with a current base station;
obtain second information indicating an estimate of a cost per unit of time;
determine, based on the first information and the second information, a first cost of not handing over a wireless device session context;
determine a second cost of handing over the wireless device session context, wherein the second cost is based at least in part on at least one of context-related data, base station load, backhaul load, or backhaul delay;
compare the first cost and the second cost;
decide whether or not to handover the wireless device session context based on the comparison of the first cost and the second cost; and
send a handover trigger as a result of deciding to handover the wireless device session context.

15. The apparatus of claim 14, wherein the processor is further configured to perform a process that includes:
estimating the amount of time the wireless device will stay associated with a current base station;
estimating the cost per unit time of not performing the wireless device session context handover; and
determining a product of the estimated amount of time the wireless device will stay associated with the current base station and the cost per unit time of not performing the wireless device session context handover, wherein the processor is configured to use the determined product to determine the first cost.

16. The apparatus of claim 15, wherein the estimating an amount of time the wireless device will stay associated with the current base station includes observing at least one of a number of previous wireless device radio handovers per unit time and a duration the wireless device has been associated with the current base station.

17. The apparatus of claim 15, wherein the estimating an amount of time the wireless device will stay associated with the current base station includes observing a wireless device profile, the wireless device profile having information including an average duration the wireless device remains in each of a plurality of cells.

18. The apparatus of claim 14, wherein the processor is configured to determine the second cost of handing over the wireless device session context by performing a process that includes at least one of:
determining a wireless device session context size indicating an amount of data to transfer in performing the wireless device session context handover,
collecting session states from an application of the session,
determining a cost of re-establishment of the session in a new base station,
determining a source base station load,
determining a target base station load,
determining a backhaul load,
determining a backhaul delay or
determining a cost of handing over the wireless device session context to a mobile management entity.

19. An apparatus for determining whether to perform a user equipment, wireless device, session context handover, the apparatus including:
processing circuitry; and
memory, the memory storing:
a non-handover cost determination module configured to determine a first cost of not handing over a wireless device session context based on i) an estimate of an amount of time a wireless device associated with the wireless device session context will stay associated with a current base station and ii) an estimate of a cost per unit time of not performing the handover;
a handover cost determination module configured to determine a second cost of handing over the wireless device session context based at least in part on at least one of context-related data, base station load, backhaul load, or backhaul delay;
a comparison module configured to compare the first cost and the second cost;
a decision module configured to decide to handover the wireless device session context based on the comparison of the first cost and the second cost; and
a handover module configured to send a handover trigger when a handover decision is made.

20. The apparatus of claim 19, wherein the non-handover cost determination module comprises instructions for:
estimating the amount of time the wireless device will stay associated with a current base station;
estimating the cost per unit time of not performing the wireless device session context handover; and
determining a product of the estimated amount of time the wireless device will stay associated with the current base station and the cost per unit time of not performing the wireless device session context handover.

* * * * *